(12) United States Patent
Leppänen et al.

(10) Patent No.: US 11,290,831 B2
(45) Date of Patent: Mar. 29, 2022

(54) AMBIENT SOUND ADJUSTMENTS DURING CALL HANDLING

(71) Applicant: Nokia Technologies Oy, Espoo (FI)

(72) Inventors: Jussi Leppänen, Tampere (FI); Miikka Vilermo, Siuro (FI); Arto Lehtiniemi, Lempäälä (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/734,253

(22) PCT Filed: Jun. 10, 2019

(86) PCT No.: PCT/EP2019/065059
§ 371 (c)(1),
(2) Date: Dec. 2, 2020

(87) PCT Pub. No.: WO2019/238592
PCT Pub. Date: Dec. 19, 2019

(65) Prior Publication Data
US 2021/0377686 A1 Dec. 2, 2021

(30) Foreign Application Priority Data
Jun. 14, 2018 (EP) .................... 18177714

(51) Int. Cl.
*H04S 7/00* (2006.01)
*H04M 3/02* (2006.01)
(Continued)

(52) U.S. Cl.
CPC .............. *H04S 7/30* (2013.01); *G06F 3/0488* (2013.01); *H04M 3/02* (2013.01); *H04R 5/04* (2013.01); *H04S 2420/11* (2013.01)

(58) Field of Classification Search
CPC combination set(s) only.
See application file for complete search history.

(56) References Cited

U.S. PATENT DOCUMENTS

| 7,162,212 B2 * | 1/2007 | Bennetts | H04B 1/123 |
| | | | 455/114.2 |
| 7,567,165 B2 * | 7/2009 | Epley | H04M 19/044 |
| | | | 340/392.3 |

(Continued)

FOREIGN PATENT DOCUMENTS

| WO | 2002/087209 A2 | 10/2002 |
| WO | 2009/097009 A1 | 8/2009 |
| WO | 2017/117293 A1 | 7/2017 |

OTHER PUBLICATIONS

Extended European Search Report received for corresponding European Patent Application No. 18177714.5, dated Dec. 19, 2018, 8 pages.

(Continued)

*Primary Examiner* — Duc Nguyen
*Assistant Examiner* — Assad Mohammed
(74) *Attorney, Agent, or Firm* — Nokia Technologies Oy

(57) ABSTRACT

Apparatuses, methods and computer programs are described comprising: providing an incoming call indication in response to an incoming call, the incoming call indication including an initial ambient audio signal comprising a combination of first ambient audio and second ambient audio; receiving an ambient audio control command; and adjusting the initial ambient audio signal to generate an adjusted ambient audio signal depending on the ambient audio control command.

20 Claims, 8 Drawing Sheets

(51) Int. Cl.
      *G06F 3/0488*   (2022.01)
      *H04R 5/04*     (2006.01)

(56) References Cited

U.S. PATENT DOCUMENTS

| 8,571,607 B1 | 10/2013 | Zarrow et al. |
| 2003/0013495 A1* | 1/2003 | Oleksy ................. H04M 19/04 455/567 |
| 2017/0331952 A1 | 11/2017 | Rogers et al. |

OTHER PUBLICATIONS

International Search Report and Written Opinion received for corresponding Patent Cooperation Treaty Application No. PCT/EP2019/065059, dated Aug. 26, 2019, 12 pages.
Office action received for corresponding European Patent Application No. 18177714.5, dated May 4, 2021, 7 pages.
Office action received for corresponding Indian Patent Application No. 202047055588, dated Aug. 16, 2021, 6 pages.

* cited by examiner (b)

US 11,290,831 B2

AMBIENT SOUND ADJUSTMENTS DURING CALL HANDLING

RELATED APPLICATION

This application claims priority to PCT Application No. PCT/EP2019/065059, filed on Jun. 10, 2019, which claims priority to EP Application No. 18177714.5, filed on Jun. 14, 2018, each of which is incorporated herein by reference in its entirety.

FIELD

The present specification relates to handling incoming calls, such as calls received at a mobile communication device.

BACKGROUND

User interfaces can be provided to enable a user to determine how to handle an incoming call. For example, such user interfaces enable a user to accept or decline a call. There remains a need for alternative call handling arrangements.

SUMMARY

In a first aspect, this specification describes an apparatus comprising: means for providing (e.g. by a server) an incoming call indication in response to an incoming call, the incoming call indication including an initial ambient audio signal comprising a combination of first ambient audio and second ambient audio; means for receiving (e.g. from a user device) an ambient audio control command; and means for adjusting the initial ambient audio signal to generate an adjusted ambient audio signal depending on the ambient audio control command.

In a second aspect, this specification describes an apparatus comprising: means for receiving (e.g. at a user device) an incoming call indication, wherein the incoming call indication includes an initial ambient audio signal comprising a combination of first ambient audio user and second ambient audio; means for providing an ambient audio control command in response to the incoming call indication; and means for presenting an adjusted ambient audio signal, wherein the initial ambient audio signal is adjusted to generate the adjusted ambient audio signal depending on the ambient audio control command.

The initial ambient audio signal may be at least one of directional and immersive audio. Alternatively, or in addition, the adjusted ambient audio signal may be at least one of directional and immersive audio.

At least one of the first and second ambient audio of the initial ambient audio signal may include spatial audio data.

The first ambient audio of the initial ambient audio signal may have a first direction and the second ambient audio of the initial ambient audio signal may have a second direction, different to the first direction.

The ambient audio control command may define a relative weighting of the first and second ambient audio provided in the adjusted ambient audio signal.

The ambient audio control command may define relative volumes of the first and second ambient audio provided in the adjusted ambient audio signal.

The ambient audio control command may select one of the first and second ambient audio for inclusion in the adjusted ambient audio signal. Furthermore, the ambient audio control command may define that the other of the first and second ambient audio is at least one of silenced, reduced in volume, reduced in space and unchanged in the adjusted ambient audio signal.

The ambient audio control command may be provided by a user using a user interface control. The user interface control may provide a gradual transition from one extreme to another. The user interface control may comprise a slide tab, a knob or a similar arrangement. Alternatively, or in addition, the user interface control may include a button, a voice input, a gesture or the like.

Some embodiments further comprise means for providing and/or receiving an incoming call, wherein the incoming call includes ambient audio depending on the ambient audio control command.

The ambient audio control command may be provided using a user interface touchscreen.

In the first and/or the second aspect, the said means may comprise at least one processor and at least one memory including computer program code, the at least one memory and the computer program code configured, with the at least one processor, to cause the performance of the apparatus.

In a third aspect, this specification describes a method comprising: providing an incoming call indication in response to an incoming call, the incoming call indication including an initial ambient audio signal comprising a combination of first ambient audio and second ambient audio; receiving an ambient audio control command; and adjusting the initial ambient audio signal to generate an adjusted ambient audio signal depending on the ambient audio control command.

In a fourth aspect, this specification describes a method comprising: receiving an incoming call indication, wherein the incoming call indication includes an initial ambient audio signal comprising a combination of first ambient audio user and second ambient audio; providing an ambient audio control command in response to the incoming call indication; and presenting an adjusted ambient audio signal, wherein the initial ambient audio signal is adjusted to generate the adjusted ambient audio signal depending on the ambient audio control command.

At least one of the initial ambient audio signal and adjusted ambient audio signal may be at least one of directional and immersive audio.

At least one of the first and second ambient audio of the initial ambient audio signal may include spatial audio data.

The first ambient audio of the initial ambient audio signal may have a first direction and the second ambient audio of the initial ambient audio signal may have a second direction, different to the first direction.

The ambient audio control command may define one or more of: a relative weighting of the first and second ambient audio provided in the adjusted ambient audio signal and relative volumes of the first and second ambient audio provided in the adjusted ambient audio signal.

The ambient audio control command may select one of the first and second ambient audio for inclusion in the adjusted ambient audio signal.

The ambient audio control command may be provided using a user interface touchscreen.

In a fifth aspect, this specification describes an apparatus configured to perform any method as described with reference to the third or fourth aspects.

In a sixth aspect, this specification describes an apparatus comprising: at least one processor; and at least one memory including computer program code which, when executed by the at least one processor, causes the apparatus to perform any method as described with reference to the third or fourth aspects.

In a seventh aspect, this specification describes computer readable instructions which, when executed by computing apparatus, cause the apparatus to perform a method as described with reference to the third or fourth aspects.

In an eighth aspect, this specification describes a computer program comprising instructions for causing an apparatus to perform at least the following: provide an incoming call indication in response to an incoming call, the incoming call indication including an initial ambient audio signal comprising a combination of first ambient audio and second ambient audio; receive an ambient audio control command; and adjust the initial ambient audio signal to generate an adjusted ambient audio signal depending on the ambient audio control command.

In a ninth aspect, this specification describes a computer program comprising instructions for causing an apparatus to perform at least the following: receive an incoming call indication, wherein the incoming call indication includes an initial ambient audio signal comprising a combination of first ambient audio user and second ambient audio; provide an ambient audio control command in response to the incoming call indication; and present an adjusted ambient audio signal, wherein the initial ambient audio signal is adjusted to generate the adjusted ambient audio signal depending on the ambient audio control command.

In a tenth aspect, this specification describes a computer readable medium (e.g. a non-transitory computer readable medium) comprising program instructions stored thereon for performing at least the following: providing an incoming call indication in response to an incoming call, the incoming call indication including an initial ambient audio signal comprising a combination of first ambient audio and second ambient audio; receiving an ambient audio control command; and adjusting the initial ambient audio signal to generate an adjusted ambient audio signal depending on the ambient audio control command.

In a eleventh aspect, this specification describes a computer readable medium (e.g. a non-transitory computer readable medium) comprising program instructions stored thereon for performing at least the following: receiving an incoming call indication, wherein the incoming call indication includes an initial ambient audio signal comprising a combination of first ambient audio user and second ambient audio; providing an ambient audio control command in response to the incoming call indication; and presenting an adjusted ambient audio signal, wherein the initial ambient audio signal is adjusted to generate the adjusted ambient audio signal depending on the ambient audio control command.

BRIEF DESCRIPTION OF THE DRAWINGS

Example embodiments will now be described, by way of example only, with reference to the following schematic drawings, in which.

DETAILED DESCRIPTION

Figure 1:
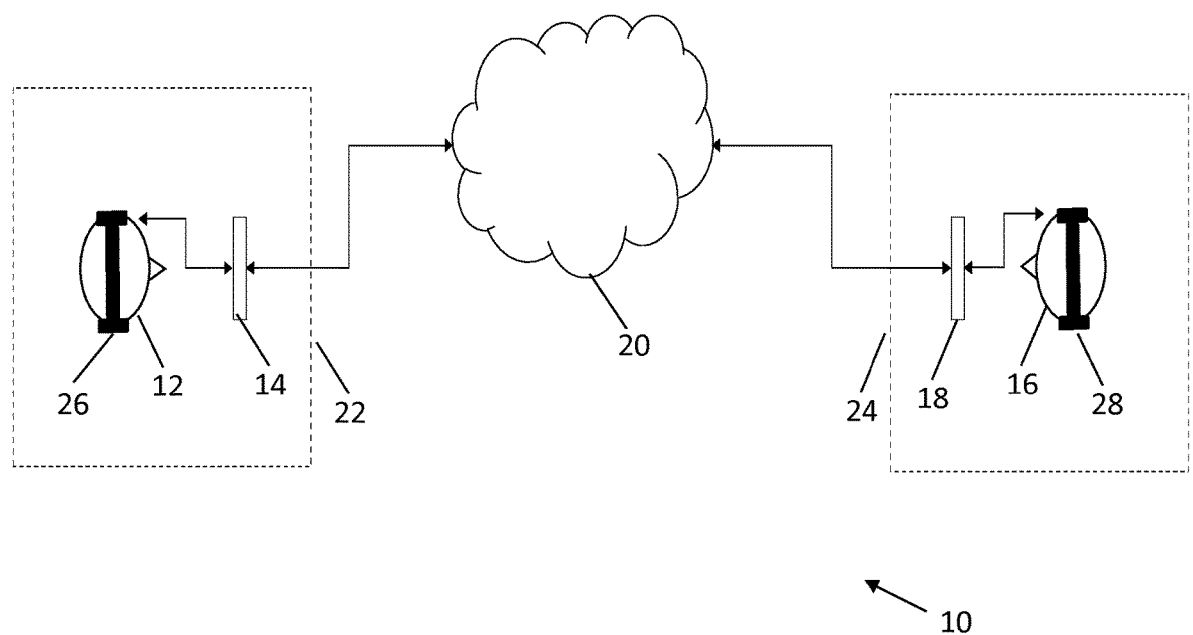
FIG. 1 is a block diagram of a system in accordance with an example embodiment.

FIG. 1 is a block diagram of a system, indicated generally by the reference numeral 10, in accordance with an example embodiment. The system 10 comprises a first user 12 having a first user device 14 and a second user 16 having a second user device 18. The first and second user devices 14 and 18 are both in two-way communication with a network 20. The first user 12 may use an audio output device 26, and the second user 16 may use an audio output device 28. The audio output devices 26 and 28 may be headphones, multidirectional loudspeakers, or the like. The first and second user devices 14 and 18 may, for example, be mobile communication devices and the network 20 may be a mobile communication network. Other communication schemes will be apparent to those skilled in the art.

Ambience 22 represents the ambience of the first user 12 and first user device 14; and ambience 24 represents the ambience of the second user 16 and second user device 18. Ambience 22 contains a first ambient audio that may be associated with the surrounding of the first user 12 and first user device 14; and ambience 24 contains a second ambient audio that may be associated with the surrounding of the second user 16 and second user device 18. The ambience 22 may exclude audio from the first user 12 (such that the ambience represents the background ambient noise at the first user 12). Similarly, the ambience 24 may exclude audio from the second user 16 (such that the ambience represents the background ambient noise at the second user 16).

Figure 2:
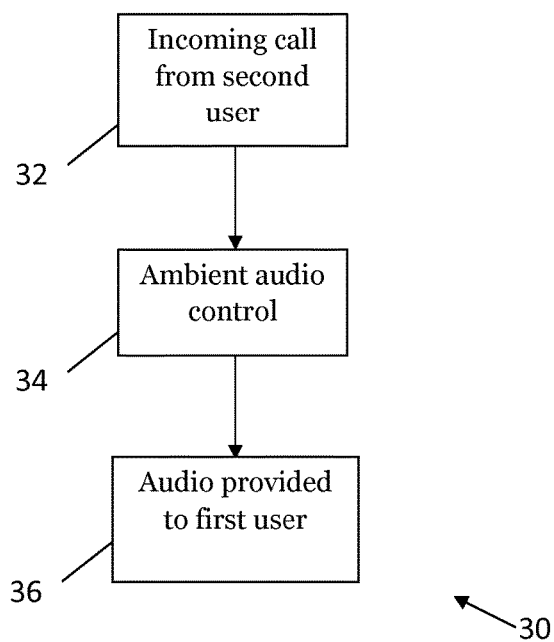
FIG. 2 is a flow chart showing an algorithm in accordance with an example embodiment.

FIG. 2 is a flow chart showing an algorithm, indicated generally by the reference numeral 30, in accordance with an example embodiment.

In one example embodiment, the algorithm starts at operation 32, where the second user 16 calls the first user 12 such that an incoming call is received at first user device 14 from the second user device 18. At operation 34, an ambient audio control is received at the first user device 14 from the first user 12. At operation 36, audio is provided to the first user 12 by the first user device 14 based on the ambient audio control received from the first user 12.

In another example embodiment, the algorithm starts at operation 32, where the network 20 provides an incoming call from the second user device 18 to the first user 12, such that the incoming call is received at the first user device 14. At operation 34, an ambient audio control command is received by the network 20 from the first user device 14. At operation 36, audio is provided to the first user 12 through the first user device 14 based, at least in part, on the ambient audio control command received at operation 34.

In one example, at operation 34, an ambient audio control command is received from the first user 12 via a user interface comprised in the first user device 14, such as a touch-screen display, a button, a voice input, a gesture, or the like. In another example, the ambient audio control is a predefined ambient audio control. The predefined ambient audio control may be stored in a memory of the first user device 14, or may be stored remotely in a server accessible using network 20.

FIGS. 3 to 6 show user interfaces used in accordance with example embodiments. In the example embodiments of FIGS. 3 to 6, the first user device 14 comprises a touch-screen display to allow the first user 12 to interact with the first user device 14 using touch commands. The use of touch screen displays is provided by way of example only. Other user inputs, including keypad inputs, joysticks and voice control will be apparent to those skilled in the art.

Figure 3:
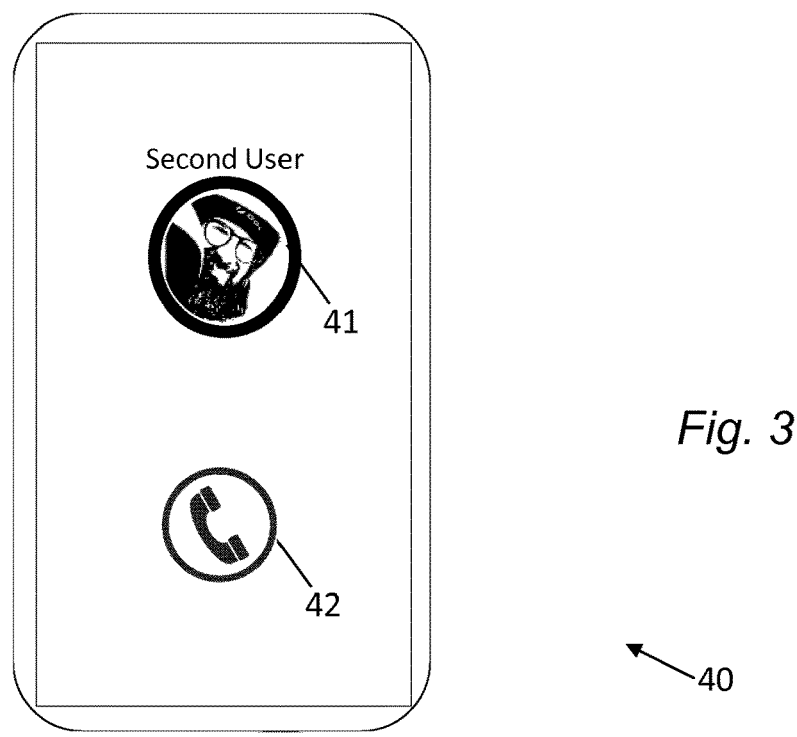
FIGS. 3 to 6 show user interfaces used in accordance with example embodiments.

FIG. 3 illustrates a user interface, indicated generally by the reference numeral 40, in accordance with an example embodiment. User interface 40 is presented to the first user 12 at the first user device 14 when an incoming call is received from the second user device 18. User interface 40 comprises an image 41 and an icon 42.

Image 41 is an image associated with the second user 16, which may be accompanied by text (e.g. the caller's name such as "second user" and/or contact number), that indicates to the first user 12 that an incoming call has been received from the second user device 18 used by the second user 16. Icon 42 is a clickable icon that the first user 12 can click for answering the incoming call. Icon 42 may be presented in the middle of the horizontal length of the user interface 40.

Figure 4:
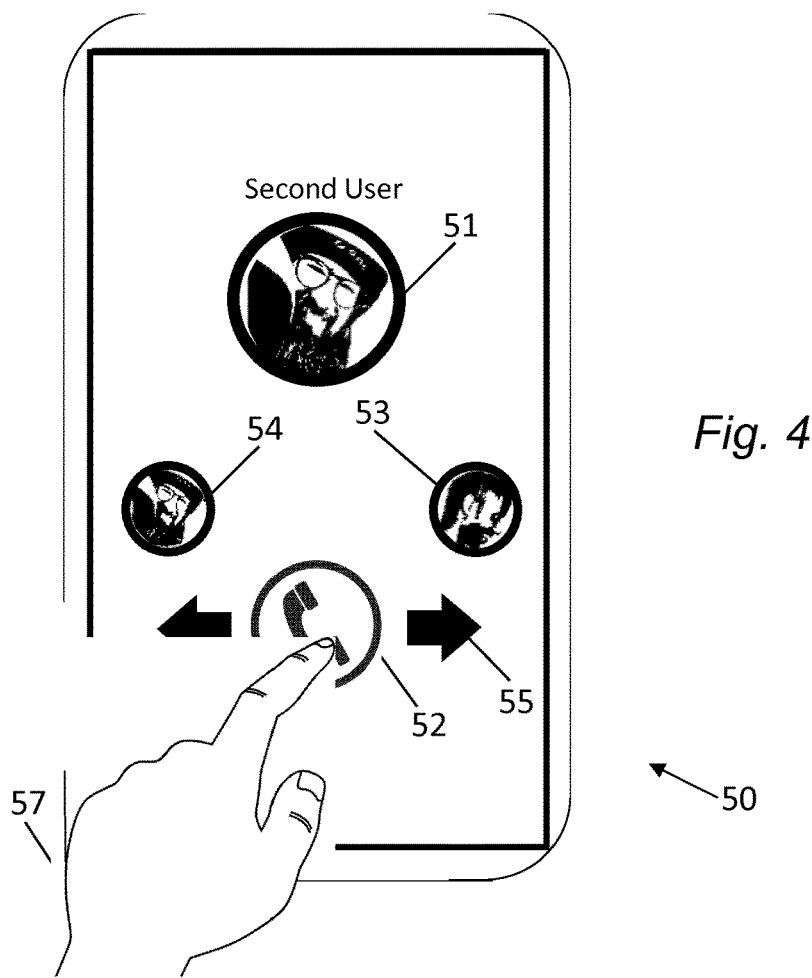

FIG. 4 illustrates a user interface, indicated generally by the reference numeral 50, in accordance with an example embodiment. User interface 50 is presented to the first user 12 at the first user device 14 when an incoming call is received from the second user device 18. User interface 50 comprises image 51, image 53, image 54, right arrow 55, left arrow 56, and icon 52. Touch 57 illustrates how the first user 12 may interact with the first user device 14 using touch commands on the user interface 50. The images 53, 54 and arrows 55 and 56 may be presented in response to the touch 57.

Image 51, similar to image 41, is an image associated with the second user 16, which may be accompanied by text (e.g. the caller's name such as "second user" and/or contact number), that indicates to the first user 12 that an incoming call has been received from the second user device 18 used by the second user 16. Image 53 is an image associated with the first user 12, and is presented on the right side of the user interface 50. Image 54 is the image associated with the second user 16, and is presented on the left side of the user interface 50. The positions of images 53 and 54 are for illustration purpose only, such that the positions can be interchanged or can be in any other location of the user interface 50.

Image 53, image 54, right arrow 55 and left arrow 56 are provided in order to make it visually easier for the first user 12 to provide an ambient audio control command, and select a first ambient audio, a second ambient audio, or a combination of the first ambient audio and the second ambient audio to be included in the audio provided in the operation 36. The first ambient audio is associated with the surrounding of the first user 12 (e.g. ambience 22), and the second ambient audio is associated with the surrounding of the second user 16 (e.g. ambience 24). Image 53, being on the right side of the user interface 50, indicates to the first user 12 that if icon 52 is slid towards the right side of the user interface 50, i.e. along right arrow 55, using touch 57, the first ambient audio will be selected. Image 54, being on the left side of the user interface 50, indicates to the first user 12 that if icon 52 is slid towards the left side of the user interface 50, i.e. along left arrow 56, using touch 57, the first ambient audio will be selected.

The sizes of images 53 and 54 are illustrated to be smaller than the size of image 51, as the purpose of displaying images 53 and 54 is different than that of displaying image 51.

Figure 5:
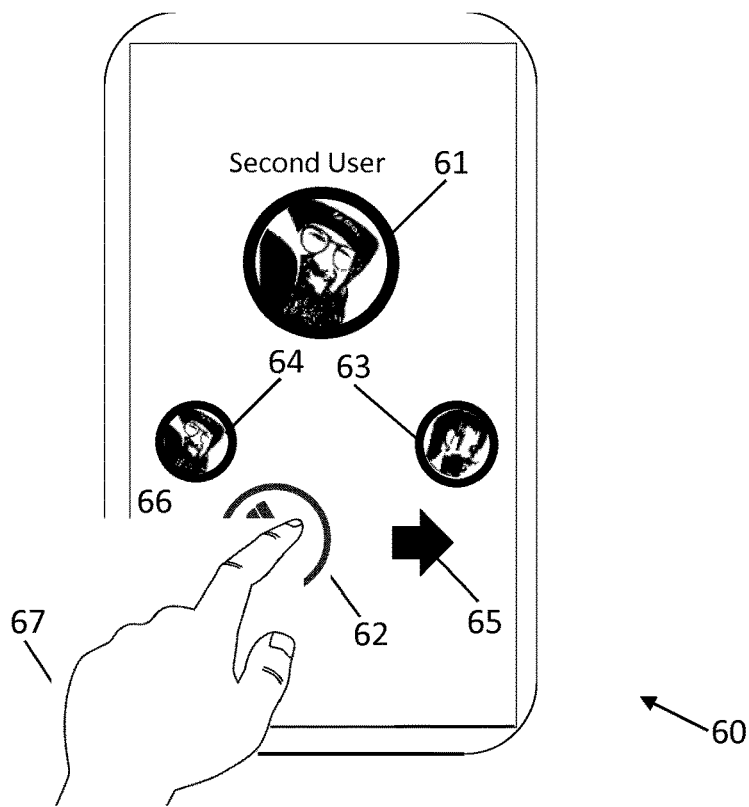

FIG. 5 illustrates a user interface, indicated generally by the reference numeral 60, in accordance with an example embodiment. User interface 60 is presented to the first user 12 at the first user device 14 when an incoming call is received from the second user device 18. User interface 60 further illustrates how the first user 12 can select the second ambient audio, or set a higher volume for the second ambient audio. User interface 60 comprises image 61 (similar to images 41 and 51), image 63 (similar to image 53), image 64 (similar to image 54), right arrow 65 (similar to right arrow 55), left arrow 66 (similar to left arrow 56), and icon 62 (similar to icons 42 and 52). Touch 67 illustrates how the first user 12 may slide the icon 62 towards the left side of user interface 60 in order to select the second ambient audio (associated with the second user 16), or set a higher volume for the second ambient audio.

Figure 6:
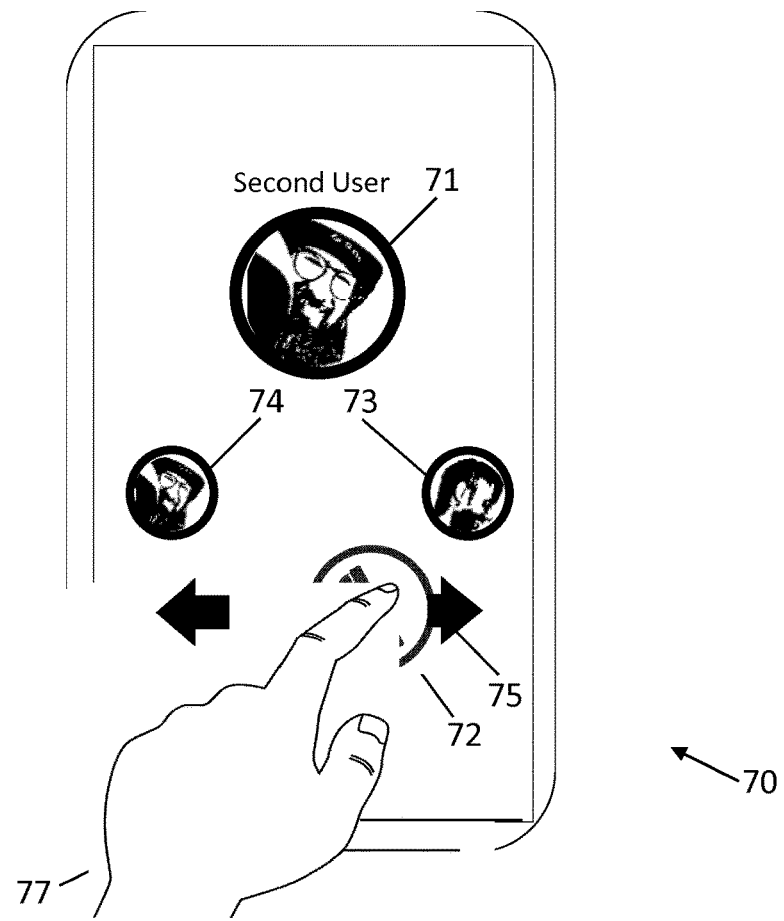

FIG. 6 illustrates a user interface, indicated generally by the reference numeral 70, in accordance with an example embodiment. User interface 70 is presented to the first user 12 at the first user device 14 when an incoming call is received from the second user device 18.

User interface 70 further illustrates how the first user 12 can select the first ambient audio, or set a higher volume for the first ambient audio. User interface 70 comprises image 71 (similar to images 41, 51, and 61), image 73 (similar to images 53 and 63), image 74 (similar to images 54 and 64), right arrow 75 (similar to right arrows 55 and 65), left arrow 76 (similar to left arrows 56 and 66), and icon 62 (similar to icons 42, 52, and 62). Touch 77 illustrates how the first user 12 may slide the icon 72 towards the right side of user interface 70 in order to select the first ambient audio (associated with the first user 12), or set a higher volume for the first ambient audio.

The user interfaces 40, 50, 60 and 70 are provided by way of example only. Many variants are possible. The images 41, 51, 61 and 71 are not essential to all embodiments; such images could, for example, be replaced with text or some other caller identification or omitted entirely. Similarly, the images 53, 54, 64, 64, 73 and 74 could be replaced with text or some other caller identification or omitted entirely. Further, some or all of the icons 42, 52, 62, 72 could be replaced or omitted.

Further details of how the first user 12 can use user interfaces 50, 60, or 70 for providing ambient audio control are discussed below.

In one example, viewed in conjunction with FIG. 3 and FIG. 4, when an incoming call is received the first user 12 may hear a ringtone (or be alerted to the incoming call in some other way), as well as a first combination of the first ambient audio and the second ambient audio. In the first combination of the first ambient audio and the second ambient audio, the first ambient audio and the second ambient audio may have equal volumes.

In one example, referring to FIGS. 4 to 6, sliding an icon to the left (such as the icon 62 as shown in FIG. 5) results in an increase in the volume of the ambient audio 24 of the second user. The volume may depend on how far the icon slides from the centre position shown in FIG. 4. In this case, the ambient audio 22 of the first user may be silenced, reduced or kept at the same level as previously. Similarly, sliding an icon to the right (such as the icon 72 as shown in FIG. 6) results in an increase in the volume of the ambient audio 22 of the first user. Again, the volume may depend on how far the icon slides from the centre position shown in FIG. 4. In this case, the ambient audio 24 of the second user may be silenced, reduced or kept at the same level as previously.

In one example, referring to FIGS. 4 to 6, the right arrows 55, 65, and 75, and the left arrows 56, 66, and 76, may be omitted from the user interfaces 50, 60, and 70 respectively. The first user 12 may slide icons 52, 62, or 72 in a specific direction (right or left) based on the position of the images 53, 64, 74 and 53, 63, and 73. In another example, the right arrows 55, 65, and 75, and the left arrows 56, 66, and 76 are not initially provided, as shown in user interface 40 of FIG. 3. When the first user 12 starts sliding the icon 42, 52, 62, or 72, the right arrows 55, 65, or 75, and the left arrows 56, 66, or 76 may be displayed.

In one example, an incoming call is received from multiple users, e.g. the call may include more than two participants. The user interface may comprise an image, similar to images 53 and 54 for each of the participants. For example, if there are four participants including the first user 12, four images similar to image 53 may be provided. The first user 12 can slide the icon 52 towards the direction of any of the four images in order to select ambient audio associated with one of the four participants. In another example, the angles at which the icon 52 is slid may determine the volumes of the ambient audios associated with each of the participants.

Figure 7:
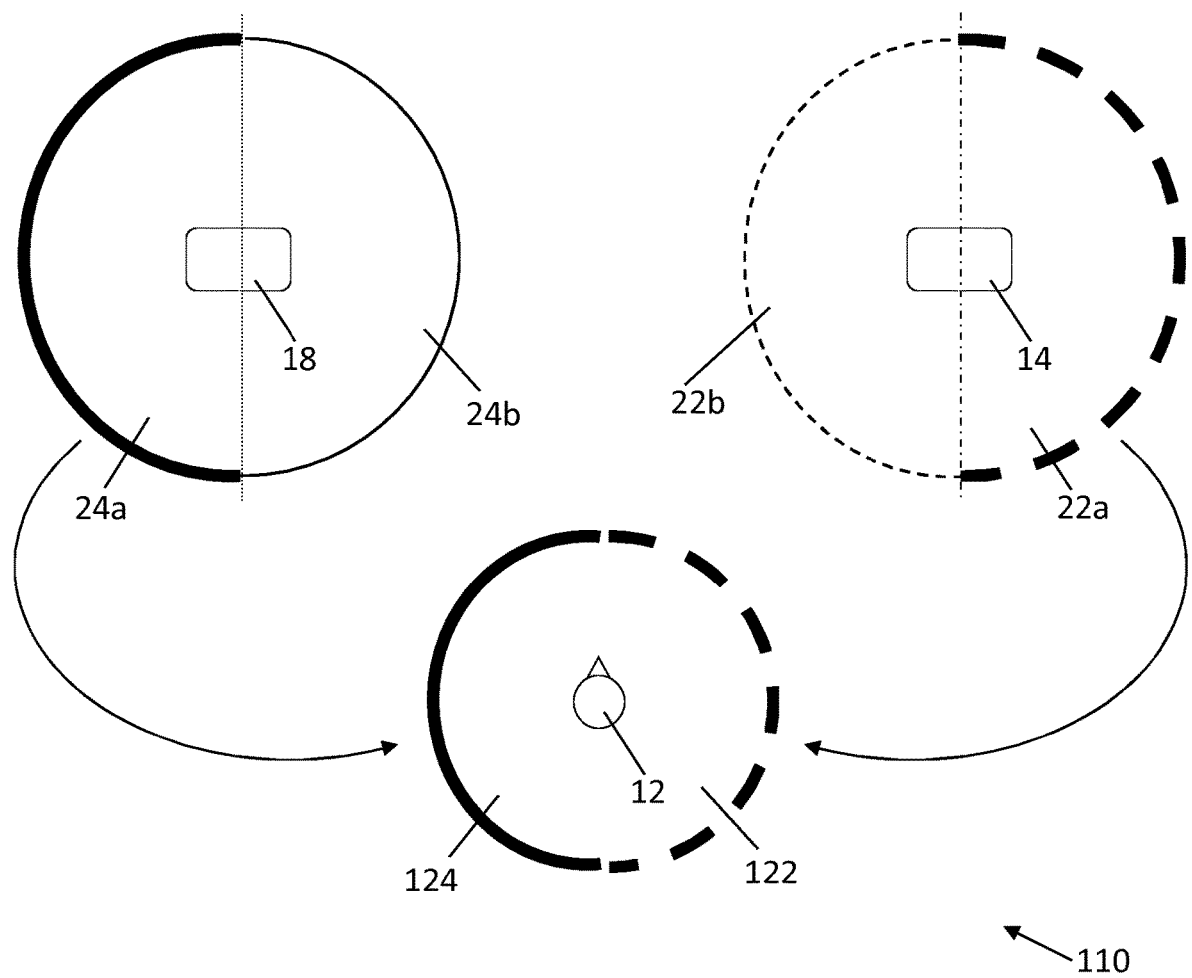
FIG. 7 is a block diagram of a system in accordance with an example embodiment.

FIG. 7 is a block diagram of a system, indicated generally by the reference numeral 110, in accordance with an example embodiment. System 110 shows an ambient audio signal provided to the first user 12. First user device 14 has ambience 22, where ambient audio 22a the ambient audio captured on the right side of ambience 22, and ambient audio 22b is the ambient audio captured on the left side of ambience 22. Similarly, second user device 18 has ambience 24, where ambient audio 24a is the ambient audio captured on the left side of ambience 24, and ambient audio 24b is the ambient audio captured on the right side of ambience 24. Audio output 122 (consisting of the ambient audio 22a) is rendered to the first user 12 from the right side of audio output device 26, and audio output 124 (consisting of the ambient audio 24a) is rendered to the first user 12 from the left side of audio output device 26.

When an incoming call is received by the first user 12 at the first user device 14, the first user 12 is able to hear in this example both the ambient audio 22a and ambient audio 24a. For example, when the first user 12 uses audio output device 26, the audio output 122 rendered from the right side of the audio output device 26 includes ambient audio 22a, and the audio output 124 rendered from the left side of the audio output device 26 includes ambient audio 24a. Audio outputs 122 and 124 may include a ringtone in addition to the ambient audios 22a and 24a.

Of course, the system 110 is provided by way of example only and many variants are possible.

Figure 8:
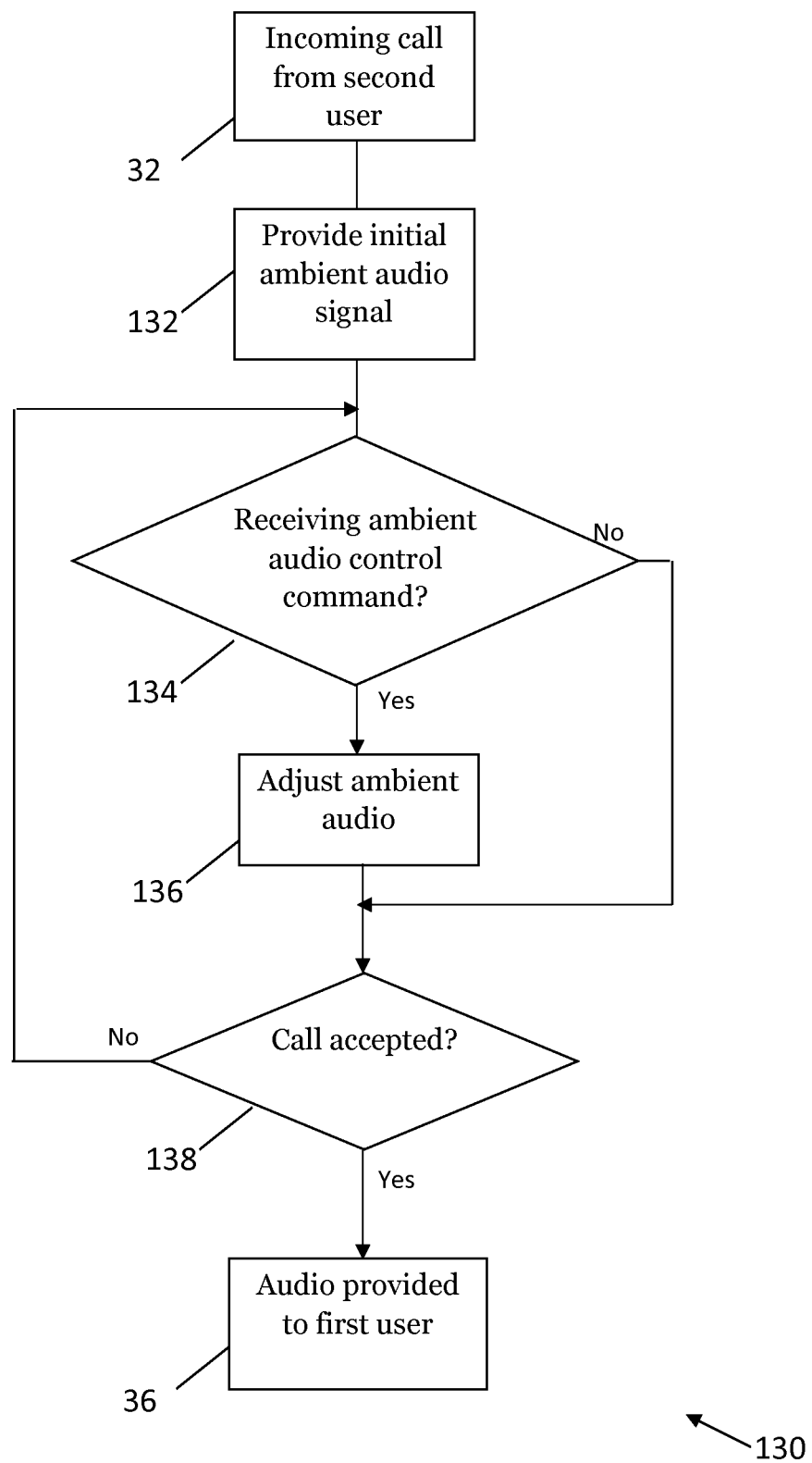
FIG. 8 is a flow chart showing an algorithm in accordance with an example embodiment.

FIG. 8 is a flow chart showing an algorithm, indicated generally by the reference numeral 130, in accordance with an example embodiment.

The algorithm 130 starts at the operation 32, where an incoming call from the second user device 18 is provided by network 20 and received at the first user device 14. At operation 132, an initial ambient audio is provided to the first user 12 using audio outputs of the first user device 14. At operation 134, the first user device 14 determines whether an ambient audio control command is received. If an ambient audio control command is received, the ambient audio hearable to the first user 12 is adjusted in operation 136. After operation 136, or if the ambient audio control command is not received, the first user device 12 determines whether the incoming call has been accepted by the first user 12 at operation 138. If the incoming call is accepted, audio is provided to the first user 12 at operation 36. If the incoming call is not accepted, operation 134 and any following operations are repeated.

The initial ambient audio may be provided at operation 132 in addition to a ringtone. Similarly, when the incoming call has not been accepted yet, the adjusted ambient audio may also be provided in addition to the ringtone. The audio provided at operation 36 includes ambient audio as well as speech of the second user 16.

In one example, the initial ambient audio provided at operation 132 is a combination of the first ambient audio (associated with the first user 12) and the second ambient audio (associated with the second user 16). As illustrated in FIG. 7, the first user 12 may hear the part of the first ambient audio (ambient audio 22a) and part of the second ambient audio (ambient audio 24a) in the initial ambient audio.

In one example, viewed in conjunction with FIGS. 3-6, the ambient audio control command is received from the first user 12 via a user interface (such as user interfaces 40, 50, 60, and 70) comprised in the first user device 14. In another example, the ambient audio control is a predefined ambient audio control. The predefined ambient audio control may be stored in a memory of the first user device 14, or may be stored remotely in a server accessible using network 20.

In one example, viewed in conjunction with FIG. 4, when the first user 12 touches the icon 52, and releases icon 52 without sliding right or left, the ambient audio control command is not received in operation 134, and the call is accepted at operation 138. At operation 36, the audio provided to the first user 12 may comprise an ambient audio that is the same as the initial ambient audio in addition to the speech of the second user 16.

In another example, viewed in conjunction with FIG. 5, when the first user 12 touches the icon 62, and slides icon 62 to the left side along left arrow 66, and then releases the icon 62, the ambient audio control command is received from the first user 12 at operation 134, and second ambient audio is selected. At operation 36, the audio provided to the first user 12 comprises the second ambient audio and the speech of the second user 16. The audio may not contain the first ambient audio, because the first user 12 selected the second ambient audio by sliding icon 62 to the left. (Alternatively, the first ambient audio may be partially, but not entirely, suppressed.)

In another example, viewing in conjunction with FIG. 6, when the first user 12 touches the icon 72, and slides icon 72 to the right side along right arrow 75, and then releases the icon 72, the ambient audio control command is received at operation 134, and first ambient audio is selected. At operation 36, the audio provided to the first user 12 comprises the first ambient audio and the speech of the second user 16. The audio may not contain the second ambient audio, because the first user 12 selected the first ambient audio by sliding icon 72 to the right. (Alternatively, the second ambient audio may be partially, but not entirely, suppressed.)

In another example, viewed in conjunction with FIG. 5, when the first user 12 touches the icon 62, and slides the icon 62 towards the left, the ambient audio control command is received at operation 134, and at operation 136, the volume of the second ambient audio increases and the volume of the first ambient audio decreases (or stays the same) as the icon 62 is being slid with touch 67. The call is not accepted at operation 138 unless the first user 12 releases the icon 62. The relative volume of the first ambient audio and the second ambient audio may depend on the exact position of the finger of the first user 12. Similarly, viewing in conjunction with FIG. 6, when the first user 12 touches the icon 72, and slides the icon 72 towards the right, the ambient audio control command is received at operation 134, and at operation 136, the volume of the first ambient audio increases and the volume of the second ambient audio decreases (or stays the same) as the icon 72 is being slid with touch 77. Therefore, the ambient audio control command received from the first user 12 defines a relative weighting of the first ambient audio and the second ambient audio, and the volumes of the first ambient audio and second ambient audio depends on their respective relative weightings. The first user 12 can continue changing the volumes of the first and second ambient audios by sliding the icons 62 or 72 left or right, until the call is accepted. Each time the icon 62 or 72 is slid, an ambient audio control command is received at operation 134, and the ambient audio is adjusted in operation 136. If the icon 62 or 72 is not released, the call is not accepted in operation 138, and the first user 12 can continue changing the volumes.

In another example, if the first user 12 releases the icon 62 or 72, the call is accepted. The relative volumes of the first ambient audio and the second ambient audio after the call is accepted depends on the position of the icon 62 or 72 when the icon 62 or 72 was released. For example, if the icon 62 is released when the position of the icon 62 is on the left side of the user interface 60, the volume of the second ambient audio is higher than the volume of the first ambient audio after the call is accepted. Therefore, the audio provided to the first user 12 at operation 36 includes higher volume of the second ambient audio and lower volume of the first ambient audio, in addition to the speech of the second user 16. Alternatively, if the icon 72 is released when the position of the icon 72 is on the right side of the user interface 70, the volume of the first ambient audio is higher than the volume of the second ambient audio after the call is accepted. Therefore, the audio provided to the first user 12 at operation 36 includes higher volume of the first ambient audio and lower volume of the second ambient audio, in addition to the speech of the second user 16.

In the examples described above, the audio output 122 and the audio output 124 are each described as being rendered over 50% of the audio space. This is not essential to all embodiments. For example, the audio may be mixed. Alternatively, or in addition, the proportion of the audio space over which an audio output is rendered may be variable. Thus, for example, as one of the audio outputs is increased in volume, the proportion of the audio space occupied by that audio output could be increased.

In another example, at operation 134, an ambient audio control command is received from a predefined ambient audio control. The predefined ambient audio control may be stored in the first user device 14 or may be remotely accessible via network 20. For example, the predefined audio ambient control may be defined such that the first ambient audio associated with the first user 12 is selected by default. Alternatively, the predefined audio ambient control may be defined such that the second ambient audio associated with the second user 16 is selected by default. Alternatively, predefined audio ambient control may be defined such that the ambient audio that is relatively louder is selected by default. Alternatively, the predefined audio ambient control may be defined such that the ambient audio that is relatively less loud is selected by default. Alternatively, the predefined audio ambient control is based on a statistical analysis of previous ambient audio control commands received from the first user 12. In one example, when the predefined ambient audio control causes selection of the first ambient audio, the icon 52, 62, or 72 is visually shown to slide towards the right side of the user interface 50, 60, or 70 automatically, without requiring the first user 12 to slide the icon 52, 62, or 72 towards the right side. Similarly, when the predefined ambient audio control causes selection of the second ambient audio, the icon 52, 62, or 72 is visually shown to slide towards the left side of the user interface 50, 60, or 70 automatically, without requiring the first user 12 to slide the icon 52, 62, or 72 towards the left side.

Figure 9:
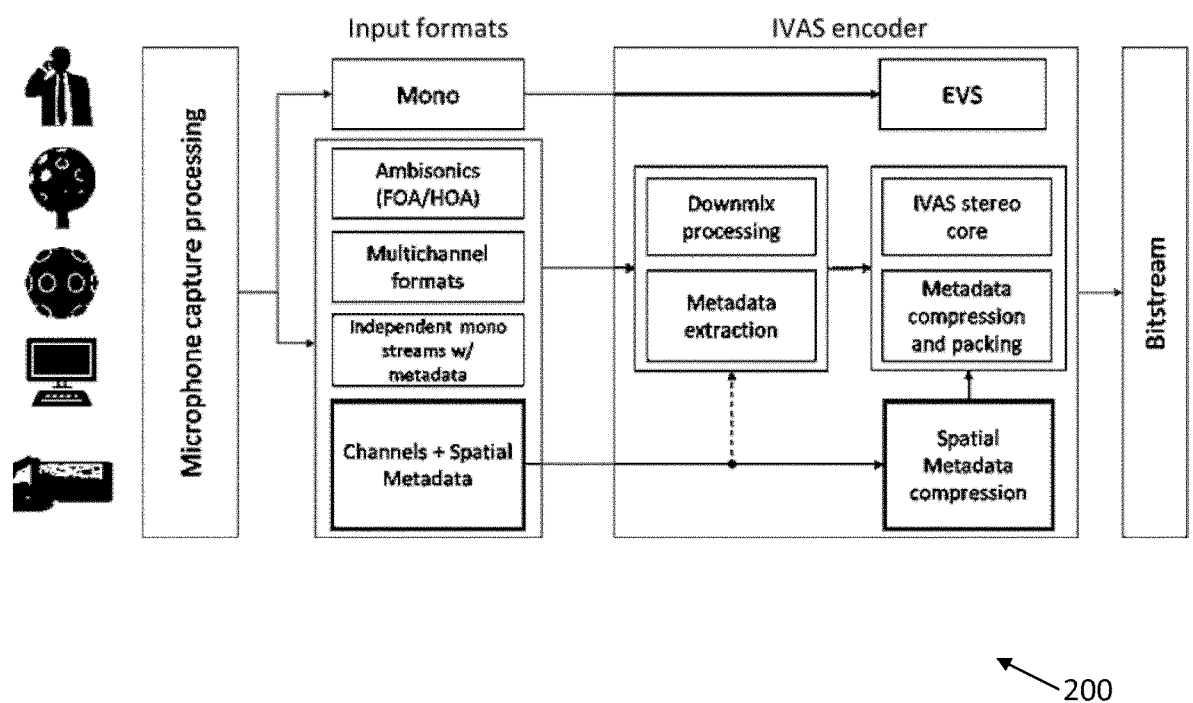
FIG. 9 is a block diagram of a system in accordance with an example embodiment.

FIG. 9 is a block diagram of a system, indicated generally by the reference numeral 200, in accordance with an example embodiment. The invention may be implemented in a system having speech and audio codecs (such as immersive audio codecs) supporting a multitude of operating points ranging from a low bit rate operation to transparency. An example of such a codec is the 3GPP IVAS codec. The IVAS codec is an extension of the 3GPP EVS codec and is intended for immersive voice and audio services over 4G/5G. Such immersive services include, for example, immersive voice and audio for virtual reality (VR). The multi-purpose audio codec is expected to handle the encoding, decoding and rendering of speech, music and generic audio. It is expected to support channel-based audio and scene-based audio inputs including spatial information about the sound field and source sources.

The system 200 shows an example IVAS encoder and supported input formats.

The spatial audio for an immersive audio call in accordance with some embodiments described herein can be captured in various ways. For example, the capture may be from a multi-microphone mobile device of a spherical microphone (e.g. Eigenmike), or may be based on a conferencing system with a microphone array and/or separate microphones for each participant. It can also include at least some content that is not captured 'live', such as, for example, background music that is mixed to the captured audio. In addition, the captured audio can come from several separate capture devices and be combined prior to encoding. For example, a mobile device or Eigenmike may capture a baseline spatial audio which is supplemented by lavalier microphone capture. Furthermore, at least the IVAS codec described above may allow for some combination of audio inputs. For example, a channel-based audio may be combined with at least one independent mono stream with metadata. Alternative, a metadata-assisted spatial audio (MASA) may be used as the spatial bed.

Figure 10:
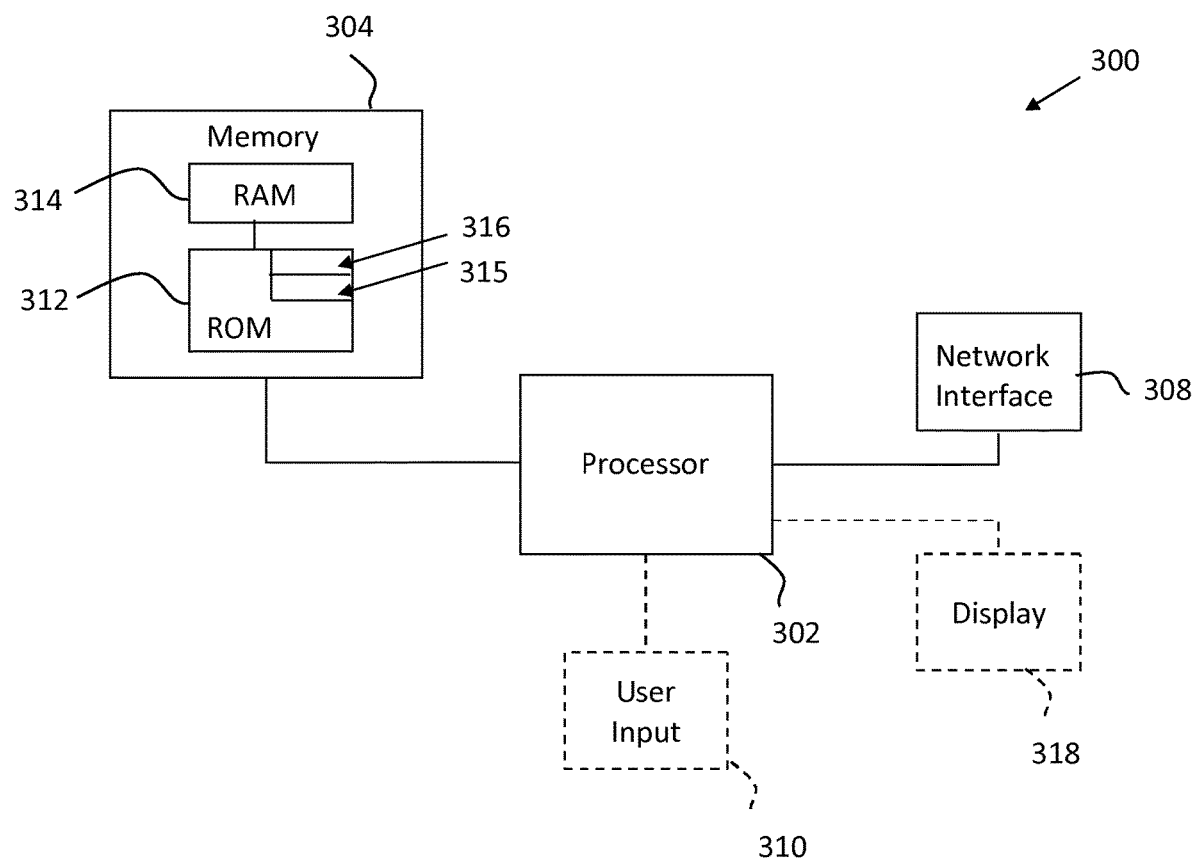
FIG. 10 is a block diagram of a system in accordance with an example embodiment.

For completeness, FIG. 10 is a schematic diagram of components of one or more of the modules for implementing the algorithms described above, which hereafter are referred to generically as processing systems 300. A processing system 300 may have a processor 302, a memory 304 coupled to the processor and comprised of a RAM 314 and ROM 312, and, optionally, user inputs 310 and a display 318. The processing system 300 may comprise one or more network interfaces 308 for connection to a network, e.g. a modem which may be wired or wireless.

The processor 302 is connected to each of the other components in order to control operation thereof.

The memory 304 may comprise a non-volatile memory, a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor, implements aspects of the algorithms 30 and 130.

The processor 302 may take any suitable form. For instance, it may be a microcontroller, plural microcontrollers, a processor, or plural processors. Processor 302 may comprise processor circuitry.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there.

Figure 11A:
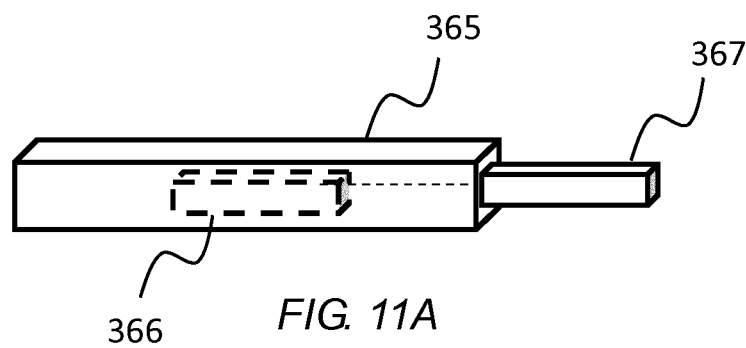
FIGS. 11A and 11B show tangible media, respectively a removable memory unit and a compact disc (CD) storing computer-readable code which when run by a computer perform operations according to embodiments.
Figure 11B:
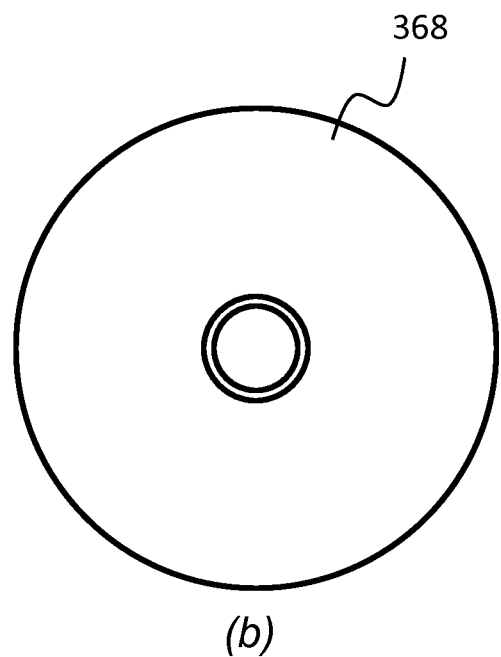

FIG. 11A and FIG. 11B show tangible media, respectively a removable, non-volatile, memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code; the at least one memory and the computer program code configured to, with the at least one processor, cause the apparatus at least to perform:
   receive an incoming call indication, wherein the incoming call indication includes an initial ambient audio signal comprising a combination of first ambient audio and second ambient audio, wherein the first ambient audio is associated with a first user, and the second ambient audio is associated with a second user;
   provide an ambient audio control command in response to the incoming call indication; and
   present an adjusted ambient audio signal, wherein the initial ambient audio signal is adjusted to generate the adjusted ambient audio signal depending on the ambient audio control command.

2. An apparatus as claimed in claim 1, wherein at least one of the initial ambient audio signal or the adjusted ambient audio signal is at least one of directional or immersive audio.

3. An apparatus as claimed in claim 1, wherein at least one of the first or second ambient audio of the initial ambient audio signal includes spatial audio data.

4. An apparatus as claimed in claim 1, wherein the first ambient audio of the initial ambient audio signal has a first direction and the second ambient audio of the initial ambient audio signal has a second direction, different to the first direction.

5. An apparatus as claimed in claim 1, wherein the ambient audio control command defines a relative weighting of the first and second ambient audio provided in the adjusted ambient audio signal.

6. An apparatus as claimed in claim 1, wherein the ambient audio control command defines relative volumes of the first and second ambient audio provided in the adjusted ambient audio signal.

7. An apparatus as claimed in claim 1, wherein the ambient audio control command selects one of the first and second ambient audio for inclusion in the adjusted ambient audio signal.

8. An apparatus as claimed in claim 7, wherein the ambient audio control command defines that the other of the first and second ambient audio is at least one of silenced, reduced in volume, reduced in space or unchanged in the adjusted ambient audio signal.

9. An apparatus as claimed in any claim 1, wherein the ambient audio control command is provided by the first user using a user interface control.

10. An apparatus as claimed in claim 1, wherein the at least one memory and the computer program code further are configured to, with the at least one processor, cause the apparatus to perform:
receive an incoming call, wherein the incoming call includes ambient audio depending on the ambient audio control command.

11. An apparatus as claimed in claim 1, wherein the ambient audio control command is provided using a user interface touchscreen.

12. A method comprising:
receiving an incoming call indication in response to an incoming call, wherein the incoming call indication includes an initial ambient audio signal comprising a combination of first ambient audio and second ambient audio, wherein the first ambient audio is associated with a first user, and the second ambient audio is associated with a second user;
providing an ambient audio control command in response to the incoming call indication; and
presenting an adjusted ambient audio signal, wherein the initial ambient audio signal is adjusted to generate the adjusted ambient audio signal depending on the ambient audio control command.

13. A method as claimed in claim 12, wherein at least one of the initial ambient audio signal or the adjusted ambient audio signal is at least one of directional or immersive audio.

14. A method as claimed in claim 12, wherein at least one of the first or second ambient audio of the initial ambient audio signal includes spatial audio data.

15. A method as claimed in claim 12, wherein the first ambient audio of the initial ambient audio signal has a first direction and the second ambient audio of the initial ambient audio signal has a second direction, different to the first direction.

16. A method as claimed in claim 12, wherein the ambient audio control command defines a relative weighting of the first and second ambient audio provided in the adjusted ambient audio signal.

17. A method as claimed in claim 12, wherein the ambient audio control command defines relative volumes of the first and second ambient audio provided in the adjusted ambient audio signal.

18. A method as claimed in claim 12, wherein the ambient audio control command selects one of the first and second ambient audio for inclusion in the adjusted ambient audio signal.

19. A method as claimed in claim 18, wherein the ambient audio control command defines that the other of the first and second ambient audio is at least one of silenced, reduced in volume, reduced in space or unchanged in the adjusted ambient audio signal.

20. A non-transitory computer readable medium comprising program instructions stored thereon for performing at least the following:
receiving an incoming call indication in response to an incoming call, wherein the incoming call indication includes an initial ambient audio signal comprising a combination of first ambient audio and second ambient audio, wherein the first ambient audio is associated with a first user, and the second ambient audio is associated with a second user;
providing an ambient audio control command in response to the incoming call indication; and
presenting an adjusted ambient audio signal, wherein the initial ambient audio signal is adjusted to generate the adjusted ambient audio signal depending on the ambient audio control command.

* * * * *